United States Patent
Gwak et al.

(10) Patent No.: US 8,467,627 B2
(45) Date of Patent: Jun. 18, 2013

(54) METHOD AND APPARATUS FOR PERFORMING WARP PROCESSING ON AN INPUT IMAGE

(75) Inventors: Jin-pyo Gwak, Seoul (KR); Heo-won Kim, Daejeon (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 302 days.

(21) Appl. No.: 12/916,706

(22) Filed: Nov. 1, 2010

(65) Prior Publication Data

US 2011/0116720 A1    May 19, 2011

(30) Foreign Application Priority Data

Nov. 17, 2009    (KR) .................. 10-2009-0110915

(51) Int. Cl.
*G06K 9/40*    (2006.01)

(52) U.S. Cl.
USPC .......................................... 382/275; 382/224

(58) Field of Classification Search
None
See application file for complete search history.

(56) References Cited

U.S. PATENT DOCUMENTS

| | | | |
|---|---|---|---|
| 7,385,612 B1 | 6/2008 | Peterson | |
| 2007/0248281 A1* | 10/2007 | Super et al. | 382/275 |
| 2009/0059041 A1 | 3/2009 | Kwon | |
| 2009/0060290 A1* | 3/2009 | Sabe et al. | 382/118 |
| 2009/0115864 A1* | 5/2009 | Ogawa | 348/222.1 |
| 2009/0285481 A1* | 11/2009 | Ishida | 382/167 |

OTHER PUBLICATIONS

C.A. Glasbey and K.V. Mardia, "A Review of Image Warping Methods", 1998, Journal of Applied Statistics, 25, pp. 155-171.*
W. Zhao, R. Chellappa, P.J. Phillips, and A. Rosenfeld, "Face Recognition: A Literature Survey", Dec. 2003, ACM Computing Surveys, vol. 35, No. 4, pp. 399-458.*

* cited by examiner

*Primary Examiner* — Andrew W Johns
*Assistant Examiner* — Siamak Harandi
(74) *Attorney, Agent, or Firm* — Drinker Biddle & Reath LLP

(57) ABSTRACT

A method and apparatus for image processing includes detecting a face area in an input image, detecting an eye in the detected face area, determining a center point based on the detected eye, and performing warp processing on the input image based on the center point. Accordingly, it is not necessary to manually set areas for the warp processing.

19 Claims, 7 Drawing Sheets

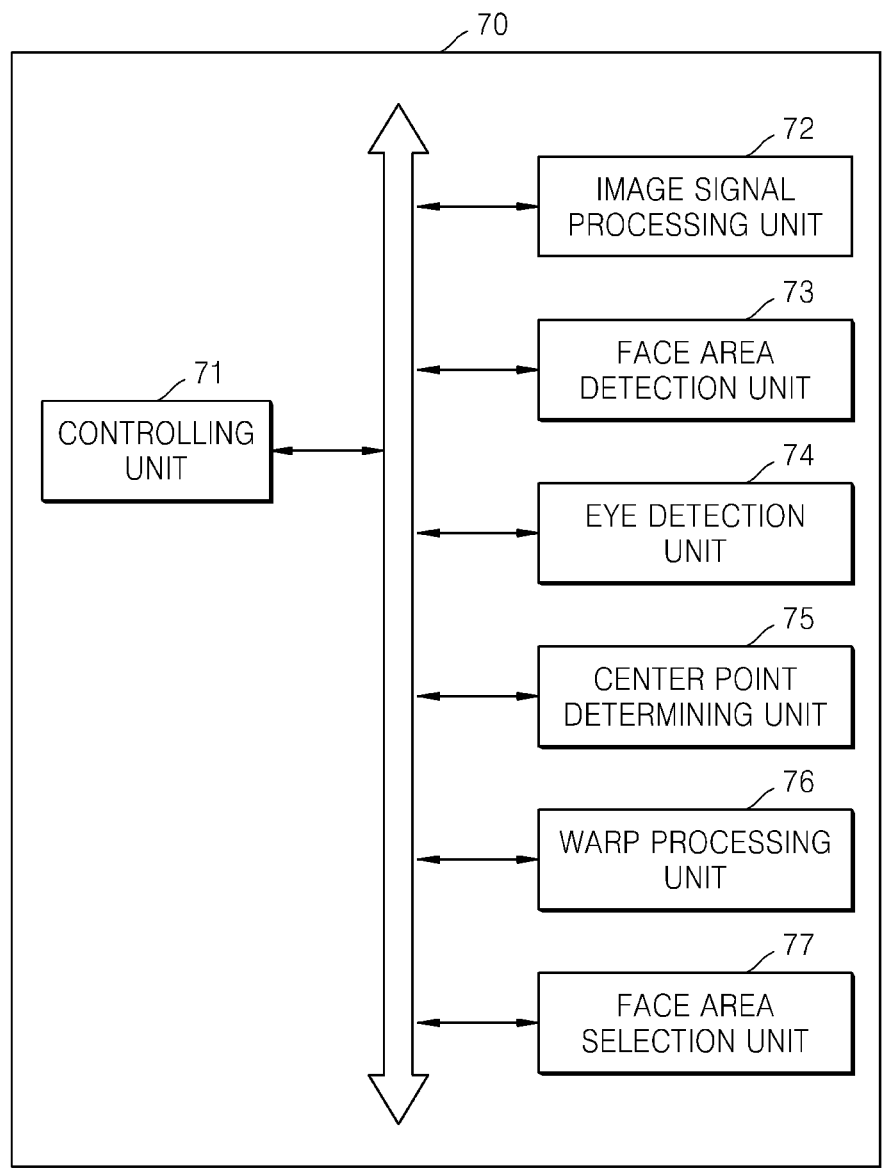

METHOD AND APPARATUS FOR PERFORMING WARP PROCESSING ON AN INPUT IMAGE

CROSS-REFERENCE TO RELATED PATENT APPLICATION

This application claims the priority benefit of Korean Patent Application No. 10-2009-0110915, filed on Nov. 17, 2009, in the Korean Intellectual Property Office, the disclosure of which is incorporated herein in its entirety by reference.

BACKGROUND

1. Field of the Invention

Embodiments relate to image processing, particularly to a method and apparatus for image processing using face detection in a digital photographing apparatus.

2. Description of the Related Art

As one of the image transforming technologies, image warping technology is technology of expanding or contracting a whole image or a portion thereof. In the case of a lens having an ultra-wide angle of view, image distortion occurs elliptically with respect to the optical axis of the lens due to optical characteristics of the lens, and therefore the image warping technology is applied to compensate for the image distortion.

Sometimes, camera users produce characteristic photographs using the lens distortion phenomena produced using lenses such as fisheye lenses that have an ultra-wide angle of view. The fisheye lenses are typically very expensive.

SUMMARY

Embodiments include a method and an apparatus that performs a warp processing on an input image by automatically determining a datum point of an optimum area for the warp processing to provide a lens warping effect to the input image.

According to an embodiment, an image processing method includes detecting a face area in an input image, detecting an eye in the detected face area, determining a center point based on the detected eye, and performing warp processing on the input image based on the center point.

The warping processing may be an image warping using a fisheye lens filter.

The determining the center point may determine the center point for the warping processing based on position information of the detected eye.

When two eyes are detected, coordinates corresponding to a middle position between centers of the two eyes is determined as a center point.

When one eye is detected, the determining the center point for warp processing may determine where the detected eye is positioned in the detected face area, and may determine coordinates corresponding to a position at a predetermined distance from the eye position in the face area in a direction toward a center of the face area as a center point.

When at least two face areas are detected in the input image, the method of an image processing may further include selecting one face area from the at least two detected face areas.

One face area may be selected by a user from the at least two detected face areas.

The detecting the eye in the detected face area may detect an eye in the selected face area.

The input image may include a live view image or a reproduced image.

According to another embodiment, an image processing apparatus includes a face area detection unit that detects a face area in an input image; an eye detection unit that detects an eye in the detected face area; a center point determining unit that determines a center point based on the detected eye; and a warp processing unit that performs a warp processing on the input image based on the center point.

The warp processing unit may perform the warp processing on the input image by performing image warping using a fisheye lens filter.

The center point determining unit may determine a center point for the warp processing based on position information of the detected eye.

When the eye detection unit detects two eyes, the center point determining unit may determine coordinates corresponding to a middle position between centers of the two eyes as a center point.

When the eye detection unit detects one eye, the center point determining unit may determine where the detected eye is positioned in the detected face area, and may determine coordinates corresponding to a position at a predetermined distance from the eye position in the face area toward a center of the face area as a center point.

The image processing apparatus may further include a face area selection unit that selects one face area from at least two detected face areas when the face area detection unit detects at least two face areas in the input image.

The face area selection unit may select one face area from the detected at least two face areas according to a selection input through a user input unit.

The eye detection unit may detect an eye in the selected face area selected by the face area selection unit.

The input image may include a live view image or a reproduced image.

According to another embodiment, a non-transitory computer readable storage medium may have stored thereon a program executable by a processor to perform an image processing method according to another embodiment.

BRIEF DESCRIPTION OF THE DRAWINGS

The above and other features and advantages will become more apparent by describing in detail exemplary embodiments with reference to the attached drawings in which:

FIG. 2 is schematic block diagram of a digital signal processor of the digital photographing apparatus shown in FIG. 1, according to an embodiment;

DETAILED DESCRIPTION

Hereinafter, exemplary embodiments will be described in detail with reference to the attached drawings. In the following descriptions, only portions necessary for understanding operations according to the exemplary embodiments may be described, and descriptions of the other portions may be omitted so as to not obscure important concepts of the embodiments.

In addition, the meaning of the terms used in the specification and the claims that follow should not be limited to be of ordinary or literal meaning but construed as meanings and concepts not departing from the spirit and scope of the invention in order to describe the invention in the most appropriate way.

Figure 1:
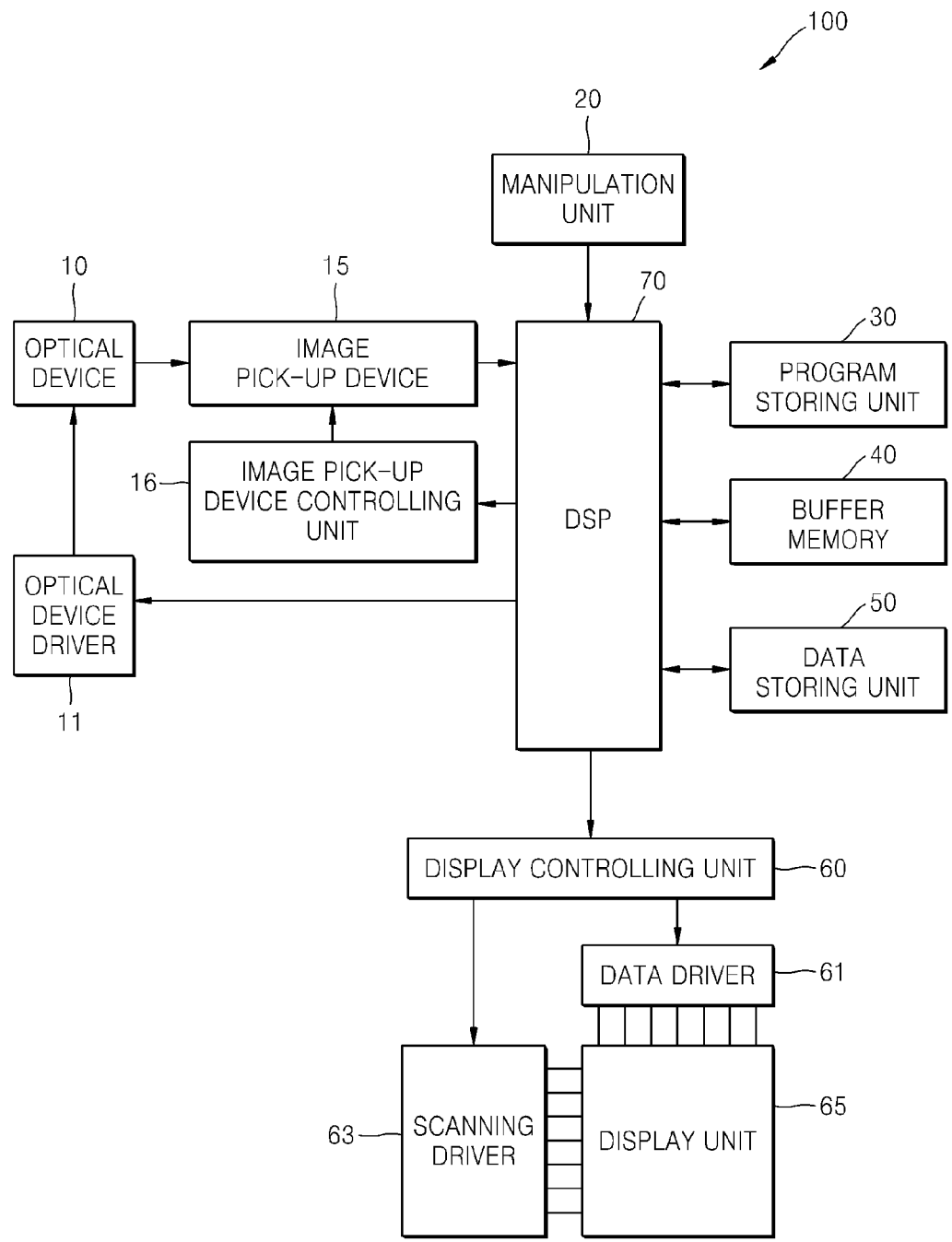
FIG. 1 is a schematic block diagram of a digital photographing apparatus, according to an embodiment.

FIG. 1 is a schematic block diagram of a digital photographing apparatus 100, according to an embodiment, and FIG. 2 is schematic block diagram of a digital signal processor (DSP) 70 of the digital photographing apparatus 100 shown in FIG. 1, according to an embodiment.

Referring to FIG. 1, the digital photographing apparatus 100 includes an optical device 10, an optical device driver 11, an image pick-up device 15, an image pickup device controlling unit 16, a manipulation unit 20, a program storing unit 30, a buffer memory 40, a data storing unit 50, a display controlling unit 60, a data driver 61, a scanning driver 63, a display unit 65, and a digital signal processor (DSP) 70.

The optical device 10 to which optical signals from a subject are input provides the optical signals to the image pick-up device 15. The optical device 10 may include at least one lens such as a zoom lens that widens or narrows an angle of view according to a focal length, a focus lens that focuses on a subject, or the like. In addition, the optical device 10 may further include an iris lens that adjusts an amount of light provided to the image pick-up device 15.

The optical device driver 11 adjusts a lens position, an iris lens opening or closing, or the like. A subject may be focused on by adjusting the lens position. In addition, the amount of light may be adjusted by adjusting the iris lens opening or closing. The optical device driver 11 may control the optical device 10 according to a control signal automatically produced by an image signal input to the optical device driver 11 in real time, or a control signal manually input to the optical device driver 11 by a user's operation.

An optical signal processed through the optical device 10 reaches a light-receiving surface of the image pick-up device 15 and forms a focused image of the subject on the light-receiving surface of the image pick-up device 15. A charge coupled device (CCD) or a complementary metal oxide semiconductor image sensor (CIS) or the like, which convert an optical signal to an electrical signal, may be used as the image pick-up device 15, The image pick-up device 15 may be adjusted in sensitivity and the like by the image pickup device controlling unit 16.

The image pickup device controlling unit 16 may control the image pick-up device 15 according to a control signal automatically produced by an image signal input to the optical device driver 11 in real time, or a control signal manually input to the optical device driver 11 by a user's operation.

A control signal may be input through the manipulation unit 20 from outside the digital photographing apparatus by a user, or the like. The manipulation unit 20 may include various functional buttons such as a shutter-release button for inputting a shutter-release signal to take a picture by exposing the image pick-up device 15 to light for a predetermined time interval, a power source button for providing power, a wide angle-zoom button and a telescopic-zoom button for widening or narrowing an angle of view according to an input, character input buttons or mode selecting buttons for selecting a photographing mode, a reproducing mode, or the like, a white balance control button for selecting white balance, and an exposure button for selecting exposure. The manipulation unit 20 may have the shape of the various buttons listed above; however, the manipulation unit 20 is not limited to these buttons, and may be realized as devices of any shape by which a user can perform input operations, such as a keyboard, a touch pad, a touch screen, a remote control, or the like.

In addition, the digital photographing apparatus 100 includes a program storing unit 30 that stores programs of an operating system, an application system, or the like that drive the digital photographing apparatus 100. The digital photographing apparatus 100 also includes the buffer memory 40 that temporarily stores data necessary during the performing of operations or result data, and the data storing unit 50 that stores various information necessary for the programs in addition to image files corresponding to image signals.

In addition, the digital photographing apparatus 100 includes the display controlling unit 60 that controls display of an operation state of the digital photographing apparatus 100 or information of an image captured by the digital photographing apparatus 100, the data driver 61 and the scanning driver 63 that transfer display data input from the display controlling unit 60, and the display unit 65 that displays a predetermined image according to signals input from the data driver 61 and the scanning driver 63. The display unit 65 may comprise a liquid-crystal display (LCD), an organic light-emitting diode (OLED) display, an electrodeposition display (EDD) or the like.

In addition, the digital photographing apparatus 100 includes the DSP 70 that processes input image signals and controls each of the elements of the digital photographing apparatus 100 according to the processed image signals or an external input signal.

The DSP 70 will be described with reference to FIG. 2.

Referring to FIG. 2, the DSP 70 includes a controlling unit 71, an image signal processing unit 72, a face area detection unit 73, an eye detection unit 74, a center point determining unit 75, a warp processing unit 76, and a face area selection unit 77. Here, it should be understood that the DSP 70 is an embodiment of the image processing apparatus recited in the claims.

The controlling unit 71 controls overall operations of the DSP 70.

The image signal processing unit 72 converts an image signal input from the image pick-up device 15 into a digital image signal, and performs image signal processing, such as gamma correction, color filter array interpolation, color matrix, color correction, color enhancement, and the like, on the digital image signal in order to convert the digital image signal into an image signal including an image visible by the user. Apart from general functions of the above described image signal processing unit, functions related to warp processing using the digital fisheye lens filter in the exemplary embodiment will be separately described as functions of the warp processing unit 76.

In addition, when the image signal processing unit 72 is preset to include an auto white balance function or an auto exposure algorithm, the image signal processing unit 72 may perform the auto white balance or auto exposure algorithm. In addition, the image signal processing unit 72 adjusts and compresses the size of image data using a scale to form an image file of a predetermined format. Reversely, the image signal processing unit 72 decompresses the compressed image file. The image signal processing unit 72 may perform the above-described image signal processing on an image signal input in real time in a live-view mode before photographing and an image signal input according to a shutter-release signal. At this time, different image signal processing can be performed on each of the image signals.

The face area detection unit 73 detects a face area from an image that is image-processed through the image signal processing unit 72. The face area detection unit 73 detects a position of a face in the input image. The face area detection unit 73 compares characteristic data of a face memorized in advance with input image data and determines whether or not the characteristic data of the face exists in the input image, and if it is determined that the characteristic data of the face exists in the input image, the face area detection unit 73 determines at which position image data of the face exists. A face area may be detected by using various face area detection methods including an AdaBoost algorithm, and using skin color information, for example. Here, a face area may not exist in an input image, or one face area or at least two face areas may exist. The input image may include a live view image or a reproduced image.

The eye detection unit 74 detects the existence and positions of the eyes of the detected face area detected by the face area detection unit 73. For example, the eyes and their position in a face area may be detected using various methods for detecting specific regions, including a projection analysis, a deformable template, an active shape model (ASM) or the like. In a projection analysis method, characteristics of each element are interpreted to perform area segmentation using x-axis and y-axis projections. In a deformable template method, an outline of an object is extracted using a similarity transformation. In an active shape model method, a shape to be extracted is defined as a model called a point distribution model, and an object having a shape similar to the model is found in an image by using an energy function. In the exemplary embodiment, it should be understood that a method of detecting the eyes in a face area is not limited to the previously described methods of detecting the eyes in a face area, and methods generally used in the field of computer vision and pattern recognition may be used.

The center point determining unit 75 determines a center point for the warp processing based on the eyes detected by the eye detection unit 74. Here, the center point determining unit 75 determines the center point for the warp processing based on number of eyes and positions of the eyes. A center point determination for the warp processing will be described later with reference to FIGS. 3A and 3B.

The warp processing unit 76 performs the warp processing of an input image by using the center point determined by the process of the center point determining unit 75 as a datum point. Here, the warp processing is an image warping using a digital fisheye lens filter, and warping is an image transforming technology involving an image processing of expanding or contracting a whole image or a portion thereof. Generally, a fisheye lens is a lens having an ultra-wide angle of view; particularly, a lens having an angle of view that is wider than 180°. A result image is output as an image distorted in a circular shape. The digital fisheye lens filter is a filter that can produce the same image as an image using a fisheye lens, and a reverse filter of a filter for compensating for a warp due to a wide-angle lens or the fisheye lens may be used as the digital fisheye lens filter. For example, in order to compensate for an image warping due to the wide-angle lens or the fisheye lens, that is, a radial warp, the wide-angle lens or the fisheye lens may be used as the digital fisheye lens filter by using a coefficient of a warp found with a warping equation or a lens warp model formula.

When the face area detection unit 73 detects a plurality of face areas in an input image, the face area selection unit 77 selects one of the face areas. Here, the user may perform a selection of one of the face areas with a user input unit (not shown). In addition, the face area selection unit 77 may automatically select a particular person or an object by using a method of selecting a particular gender, a method of selecting a particular age bracket, a method of recognizing a particular person registered in advance, or the like by utilizing a face recognizing function.

Figure 3A:
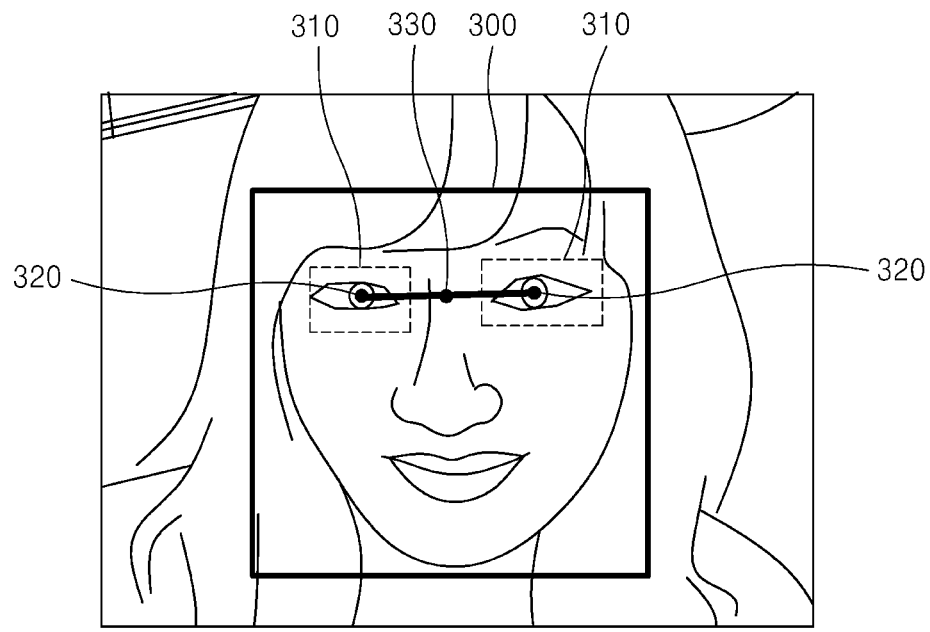
FIGS. 3A and 3B are images for describing center point determination for warp processing of a center point determining unit shown in FIG. 2, according to an embodiment.
Figure 3B:
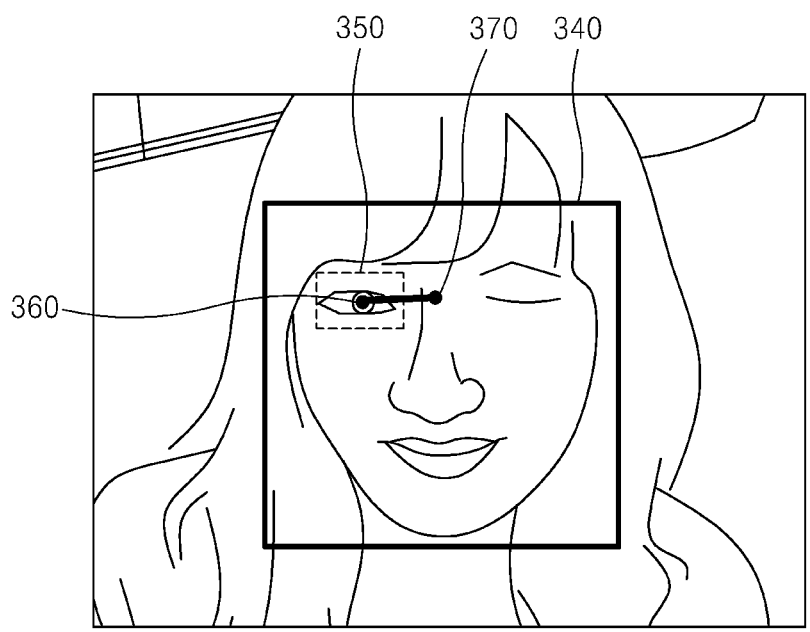

FIGS. 3A and 3B are images for describing center point determination for warp processing of the center point determining unit 75 shown in FIG. 2, according to an embodiment.

Referring to FIG. 3A, when the face area detection unit 73 detects a face area 300 in an input image, the eye detection unit 74 detects two eye areas 310 in the face area 300. The center point determining unit 75 determines a center point 330 for the warp processing, and determines the coordinates of a middle position 320 of the center of two eyes as center coordinates for the warp processing.

Referring to FIG. 3B, when the face area detection unit 73 detects a face area 340 in an input image, the eye detection unit 74 detects one eye area 350 in the face area 340. In the eye detection, according to an expression, a position, and a pose of a face, one of the two eyes may not be detected. Therefore, in this case, a center point 370 for the warp processing is determined based on the eye area 350 of the detected eye. When only one eye is detected, the coordinates of a middle position 360 of the center of the detected eye is determined where the detected eye is positioned, and a position at a predetermined distance from the eye position in the face area in a direction toward a center of the face area is determined as the center point 370. The method of determining a center point for the warp processing is not limited to the previously described methods, and it should be understood that various methods can also be used.

Figure 4A:
FIGS. 4A and 4B are an input image and a warp-processed image, according to another embodiment.
Figure 4B:

FIGS. 4A and 4B are an input image and a warp-processed image, according to another embodiment.

FIG. 4A shows an input image, and FIG. 4B shows a warp-processed image based on an automatic warp center point determination according to an embodiment.

Figure 5A:
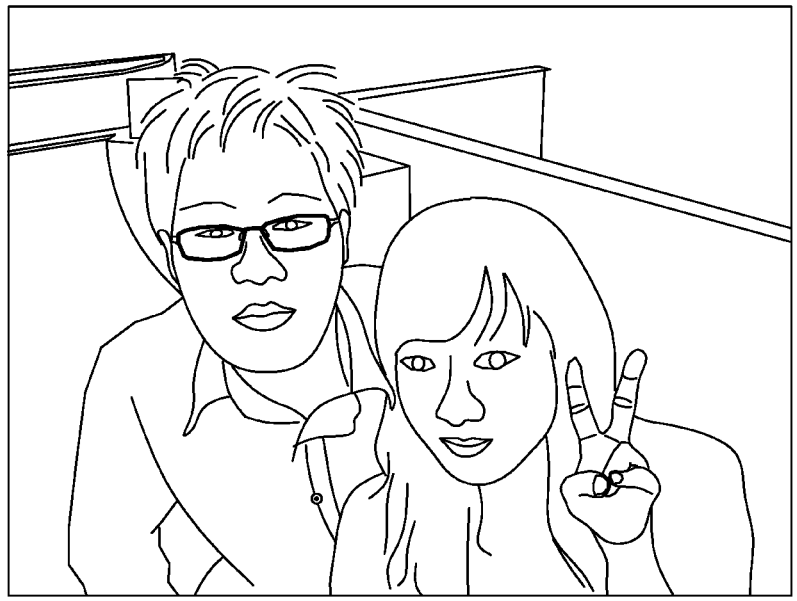
FIGS. 5A through 5C are an input image and warp-processed images, according to another embodiment.
Figure 5B:
Figure 5C:
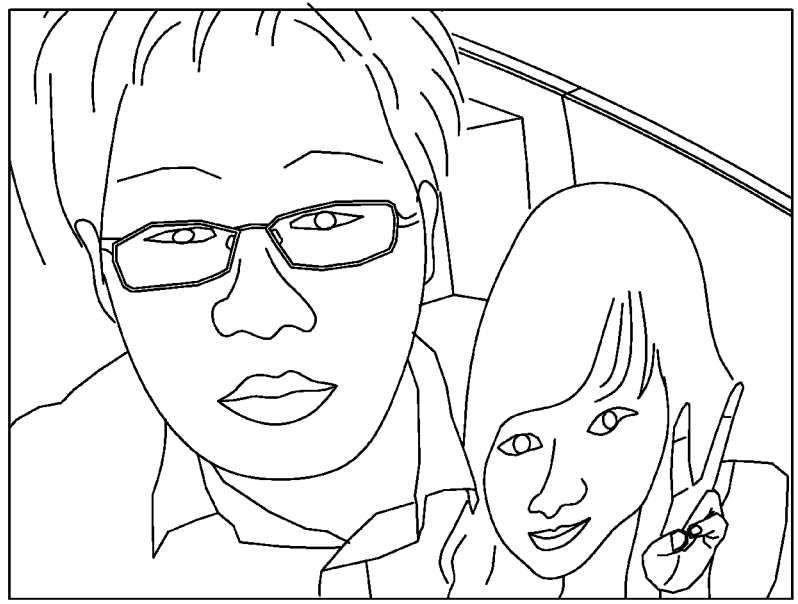

FIGS. 5A through 5C are an input image and warp-processed images, according to another embodiment;

Referring to FIGS. 5A and 5B, when two face areas exist in an input image, a face area of a main subject of the two face areas is selected to perform the warp processing thereon. For example, as shown in FIG. 5B, when a woman's face is selected, a warp-processed image is obtained with the woman's face as the main subject. Here, a face of a main subject may be selected automatically and the warp processing may be performed on the face, or a face of a main subject may be selected according to a selection by a user and the warp processing may be performed on the face. In the former case, a face area positioned at the center of an image of the detected face areas is automatically selected, and the warp processing is performed on the selected face area. Referring to FIG. 5C, in this case, a man's face is selected by the user or automatically, and the warp processing is performed with the man's face as the central subject. Therefore, when a plurality of faces are detected, a selected subject may look better by applying a lens warp effect on the selected subject with the selected subject as the central subject.

Figure 6:
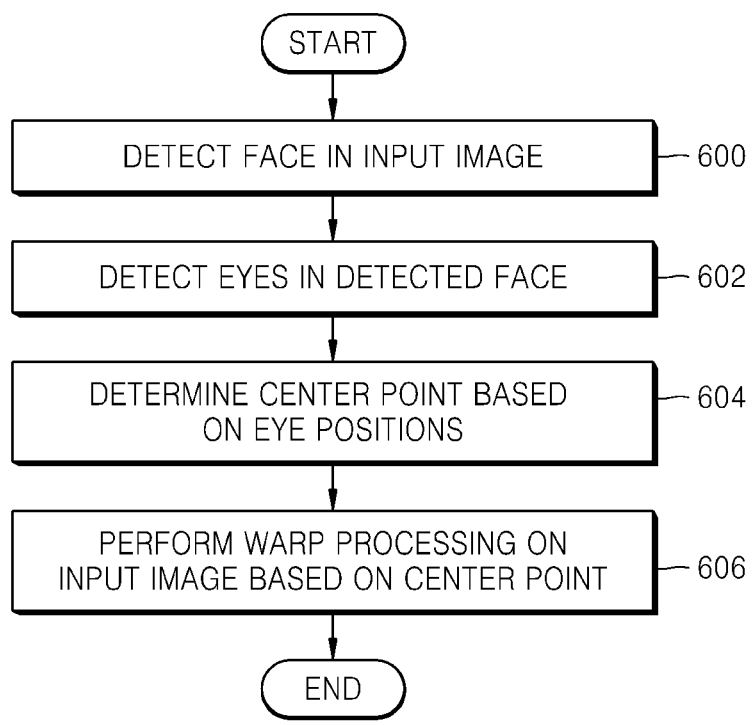
FIG. 6 is a flowchart for describing an image processing method, according to another embodiment.

FIG. 6 is a flowchart for describing an image processing method, according to an embodiment.

Referring to FIG. 6, a face is detected in an input image in operation 600. The input image may include a live view image or a reproduced image, and a plurality of faces may be detected. Eyes are detected in the detected face in operation 602. That is, one eye or two eyes existing in the detected face are detected. A center point for the warp processing is determined from positions of the detected eyes in operation 604. If one eye is detected, a position at a predetermined distance from the eye position in the face area in a direction toward a center of the face area is determined as a center point. If two eyes are detected, a center point of the positions of two eyes is determined as a center point for the warp processing. In operation 606, the warp processing is performed on the input image based on the center point determined in operation 604. Here, the warp processing means an image warping using a digital fisheye lens filter. Therefore, although areas, coordinates or the like of a face to be processed by the warp processing are not assigned, a face can be shown in a more interesting and lovely manner by performing the warp processing based on a center point that is set automatically. In addition, the above warping processing may be set as a particular image photographing mode and an image may be photographed by viewing the image in a live view mode or the warping processing may also be used to correct the image in a reproduction mode after photographing the image.

Figure 7:
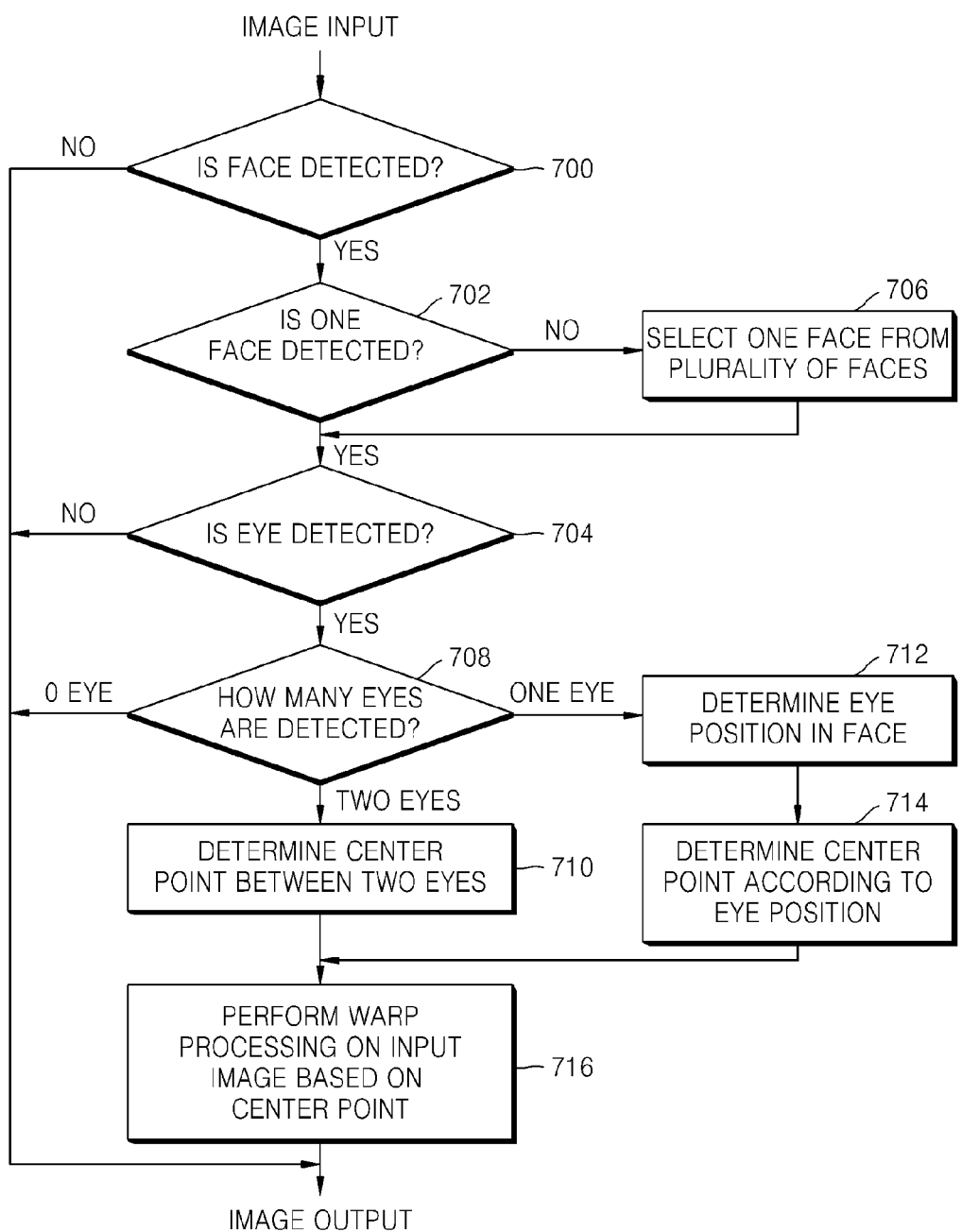
FIG. 7 is a flowchart for describing an image processing method, according to another embodiment.

FIG. 7 is a flowchart for describing an image processing method, according to another embodiment.

Referring to FIG. 7, a face is detected in an input image in operation 700. If a determination is made that a face is detected in operation 700, then in operation 702 a determination is made whether the number of detected faces is one or more. If it is determined in operation 702 that a plurality of faces are detected, the method proceeds to operation 706, and one of the faces is selected. Here, the face selection may be performed by a user, or may be automatically performed using a face recognition method or the like. Then in operation 704, eyes are detected in the face detected in operation 702 or face selected in operation 706.

If an eye is determined to be detected in operation 704, the number of detected eyes is determined in operation 708. If the number of detected eyes is two, a center point between the two eyes is determined as a center point for warp processing in operation 710. If the number of eyes detected in operation 708 is one, the method proceeds to operation 712, and the position of the detected eye in the face is determined. A center point for the warp processing is determined according to the position of the detected eye in the face in operation 714. For example, when the detected eye is positioned at a right side of the face, a point at a predetermined distance from the eye position in a left direction is determined as a center point for the warp processing.

The warp processing is performed based on the determined center point in operation 716. Here, the warp processing includes an image warping using a digital fisheye lens filter.

The above-described embodiments can be applied mainly to a digital camera as an example of a digital photographing apparatus; however, the invention is not limited to the digital camera, and it will be understood by those of ordinary skill in the art that the invention can also be applied to other apparatuses, such as a camera phone, a personal digital assistant (PDA), and a portable multimedia player (PMP) having a camera function.

According to various embodiments of the image processing method, area assignment by a user is not necessary for the warp processing, and a picture that is produced in a prettier or more interesting manner can be obtained by exaggerating a face more effectively. In addition, the image processing method can be utilized not only in a live view mode but also as a correction function in a reproducing mode after photographing an image.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. The words "mechanism" and "element" are used broadly and are not limited to mechanical or physical embodiments, but may include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". It will be recognized that the terms "comprising," "including," and "having," as used herein, are specifically intended to be read as open-ended terms of art.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

What is claimed is:

1. An image processing method comprising:
   detecting a face area in an input image;
   detecting an eye in the detected face area;
   determining a center point based on the detected eye; and
   performing non-linear warp processing on the input image based on the center point.

2. The image processing method of claim 1, wherein the warp processing is image warping using a fisheye lens filter.

3. The image processing method of claim 1, wherein the determining the center point determines the center point for the warp processing based on position information of the detected eye.

4. The image processing method of claim 3, wherein when two eyes are detected, coordinates corresponding to a middle position between centers of the two eyes is determined as a center point.

5. An image processing method comprising:
   detecting a face area in an input image;
   detecting an eye in the detected face area;
   determining a center point for warp processing based on position information of the detected eye; and
   performing warp processing on the input image based on the center point,
   wherein when one eye is detected, the determining the center point for warp processing determines where the detected eye is positioned in the detected face area, and determines coordinates corresponding to a position at a predetermined distance from the eye position in the face area in a direction toward a center of the face area as a center point.

6. The image processing method of claim 1, further including selecting one face area from at least two detected face areas when at least two faces areas are detected in the input image.

7. The image processing method of claim 6, wherein one face area is selected by a user from the at least two detected face areas.

8. The image processing method of claim 6, wherein the detecting the eye in the detected face area detects an eye in the selected face area.

9. The image processing method of claim 1, wherein the input image includes a live view image or a reproduced image.

10. A non-transitory computer-readable storage medium having stored thereon a program executable by a processor for performing an image processing method, the image processing method comprising:
    detecting a face area in an input image;
    detecting an eye in the detected face area;
    determining a center point based on the detected eye; and
    performing non-linear warp processing on the input image based on the center point.

11. An image processing apparatus comprising:
    a face area detection unit that detects a face area in an input image;
    an eye detection unit that detects an eye in the detected face area;
    a center point determining unit that determines a center point based on the detected eye; and
    a warp processing unit that performs a non-linear warp processing on the input image based on the center point.

12. The image processing apparatus of claim 11, wherein the warp processing unit performs the warp processing on the input image by performing image warping using a fisheye lens filter.

13. The image processing apparatus of claim 11, wherein the center point determining unit determines a center point for the warp processing based on position information of the detected eye.

14. The image processing apparatus of claim 13, wherein when the eye detection unit detects two eyes, the center point determining unit determines coordinates corresponding to a middle position between centers of the two eyes as a center point.

15. An image processing apparatus comprising:
    a face area detection unit that detects a face area in an input image;
    an eye detection unit that detects an eye in the detected face area
    a center point determining unit that determines a center point for warp processing based on position information of the detected eye; and
    a warp processing unit that performs a warp processing on the input image based on the center point,
    wherein when the eye detection unit detects one eye, the center point determining unit determines where the detected eye is positioned in the detected face area and determines coordinates corresponding to a position at a predetermined distance from the eye position in the face area toward a center of the face area as a center point.

16. The image processing apparatus of claim 11, further comprising a face area selection unit that selects one face area from at least two detected face areas when the face area detection unit detects at least two face areas in the input image.

17. The image processing apparatus of claim 16, wherein the face area selection unit selects one face area from the detected at least two face areas according to a selection input through a user input unit.

18. The image processing apparatus of claim 16, wherein the eye detection unit detects an eye in the selected face area selected by the face area selection unit.

19. The image processing apparatus of claim 11, wherein the input image includes a live view image or a reproduced image.

* * * * *

UNITED STATES PATENT AND TRADEMARK OFFICE
CERTIFICATE OF CORRECTION

| | | |
|---|---|---|
| PATENT NO. | : 8,467,627 B2 | Page 1 of 1 |
| APPLICATION NO. | : 12/916706 | |
| DATED | : June 18, 2013 | |
| INVENTOR(S) | : Jin-pyo Gwak et al. | |

It is certified that error appears in the above-identified patent and that said Letters Patent is hereby corrected as shown below:

ON THE TITLE PAGE:

In (75) Inventors, replace "Heo-won Kim" with --Hoe-won Kim--

IN THE CLAIMS:

Column 10, line 38, replace "area" with --area;--

Column 10, line 41, replace "the detected eve" with --the detected eye--

Signed and Sealed this
Twenty-second Day of October, 2013

Teresa Stanek Rea
*Deputy Director of the United States Patent and Trademark Office*